United States Patent [19]
Ishiguro et al.

[11] Patent Number: 5,315,444
[45] Date of Patent: May 24, 1994

[54] CASSETTE AUTOCHANGER SYSTEMS

[75] Inventors: Mamoru Ishiguro, Kanagawa; Masato Yokota, Tokyo; Shingo Yamauchi, Kanagawa, all of Japan

[73] Assignee: Sony Corporation, Tokyo, Japan

[21] Appl. No.: 674,469

[22] Filed: Mar. 25, 1991

[30] Foreign Application Priority Data

Mar. 28, 1990 [JP] Japan .................. 2-079923

[51] Int. Cl.$^5$ .................. G11B 5/86; G11B 15/68
[52] U.S. Cl. .................. 360/15; 360/69; 360/92
[58] Field of Search .......... 360/15, 69, 92, 31, 360/14.1, 13, 72.1, 72.2; 369/84, 85, 58

[56] References Cited

U.S. PATENT DOCUMENTS

| | | | |
|---|---|---|---|
| 4,637,023 | 1/1987 | Lounsbury et al. | 360/53 |
| 4,644,425 | 2/1987 | Tamaki | 360/92 |
| 4,668,999 | 5/1987 | De La Cierva, Sr. et al. | 360/14.1 |
| 4,779,151 | 10/1988 | Lind et al. | 360/69 |
| 4,794,467 | 12/1988 | Okuyama et al. | 360/15 |
| 4,846,619 | 7/1989 | Crabtree et al. | 414/273 |
| 4,937,690 | 6/1990 | Yamashita et al. | 360/69 |

FOREIGN PATENT DOCUMENTS 0162248 11/1985 European Pat. Off. .
3612531 11/1986 Fed. Rep. of Germany .
2051454 1/1981 United Kingdom .

*Primary Examiner*—Aristotelis Psitos
*Assistant Examiner*—Varsha V. Sheladia
*Attorney, Agent, or Firm*—William S. Frommer; Alvin Sinderbrand

[57] ABSTRACT

A cassette autochanger for automatically supplying and selectively reproducing a plurality of cassettes (C) having programs recorded therein comprises a plurality of recording/reproducing devices (3), a plurality of cassette storage locations (5, 6), a cassette transporter (4, 9) for transporting the cassettes (C) between the locations (5, 6) and the devices (3), a first detector (23) for detecting any one of the programs that is recorded in one only of the cassettes (C), a second detector (23) for detecting two of the devices (3) which are available for use, and a dubbing controller (24) for controlling the two detected devices (3) so that such one of the programs is automatically dubbed on to another cassette (C) using the two detected devices (3). A cassette autochanger system may comprise two cassette autochangers (41A, 41B), the second autochanger (41B) forming a back-up which takes over reproduction using an up-dated reproduction list derived from the first autochanger (41A) in the event of the first autochanger (41A) becoming out of order.

7 Claims, 5 Drawing Sheets

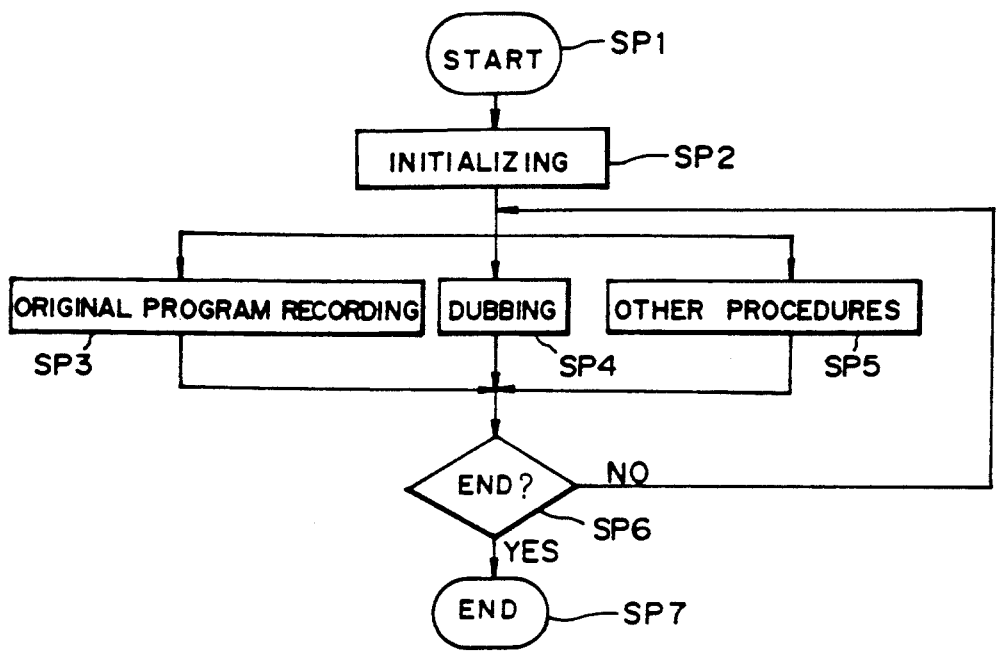
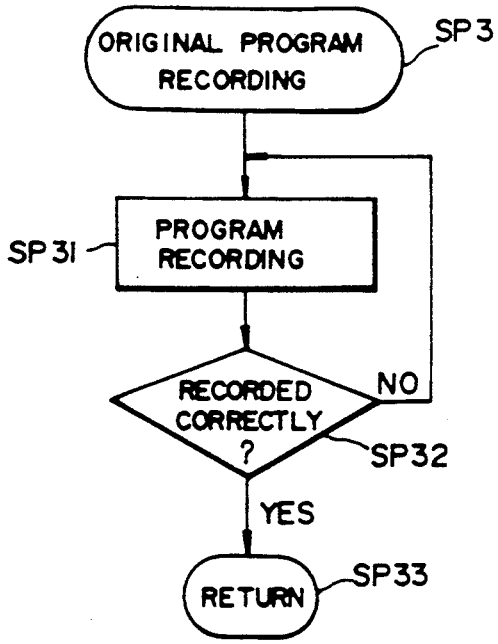
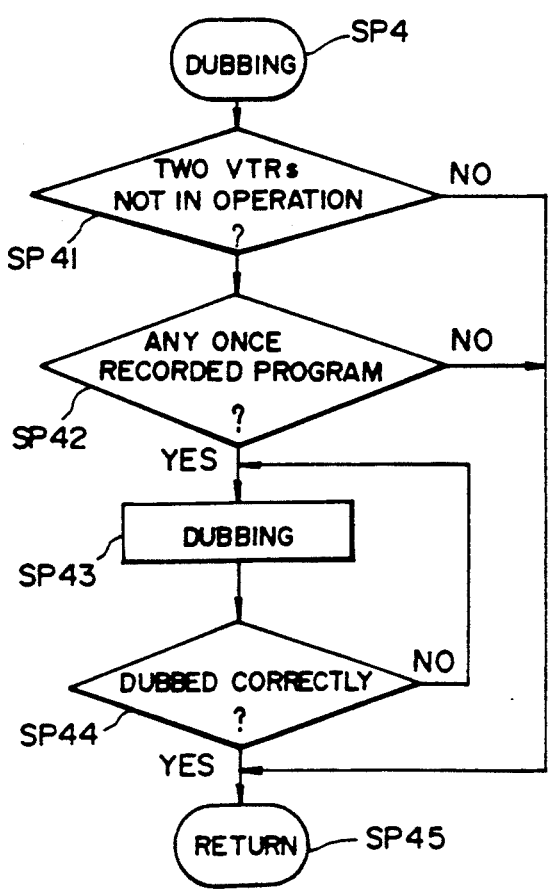

CASSETTE AUTOCHANGER SYSTEMS

BACKGROUND OF THE INVENTION

1. Field of the Invention

This invention relates to cassette autochangers and to cassette autochanger systems. Cassette autochangers are used, for example, in television broadcasting stations for storing programs such as commercial messages and advertisements, and television programs, and for selecting in a required order a sequence of the stored programs for reproduction and transmission.

2. Description of the Prior Art

FIG. 1 shows an automatic cassette supplying and reproducing apparatus or cassette autochanger as disclosed in Sony Corporation UK patent specification GB-A-2 190 233. The cassette autochanger comprises an upright, rectangular housing 1 including a video tape recorder (VTR) console 2 having a plurality of reproducing/recording devices 3, such as VTRs 3A, 3B, 3C and 3D capable of reproduction and recording of magnetic video tape cassettes (C), stacked vertically one above the other at one side of the housing 1. A cassette delivery mechanism 4 is provided to deliver to the VTR console 2, the video tape cassettes C selected from a large number of cassette storage locations 5A, 5B, 5C, 5Z and 6A, 6B, 6C formed by bins arrayed in orthogonally related directions, that is in vertical stacks arranged horizontally in succession, in front and rear banks 7 and 8. Each of the cassette storage bins in the banks 7 and 8 can store a single cassette C therein. Further, as is apparent from FIG. 1, the stacks of cassette storage bins in the front and rear banks 7 and 8 are spaced apart to provide an aisle therebetween which accommodates a cassette transporting mechanism 9. The VTRs 3 are of a side-loading type, so each is capable of receiving a cassette C at the side of the respective VTR 3 facing the cassette delivery mechanism 4, from the cassette transporting mechanism 9.

The cassette transporting mechanism 9 comprises fixed upper and lower guide rails 10A and 10B extending horizontally along the aisle, and a movable guide rail 10C extending vertically in the aisle between the front and rear banks 7 and 8, and mounted at its upper and lower ends on the rails 10A and 10B, for movements horizontally in the directions indicated by arrows X—X in FIG. 1. A cassette feeder or carriage 11 is mounted on the guide rail 10C for movements vertically as indicated by arrows Y—Y in FIG. 1. The cassette carriage 11 has openings 11A and 11B for receiving respective cassettes C. Both the guide rail 10C and the carriage 11 are moved in their respective directions by a drive mechanism (not illustrated). The housing 1 also includes a cassette in-port 12 and a cassette out-port 13.

In operation of this cassette autochanger, a selected cassette C, for example a cassette C1, is removed by the cassette carriage 11 from its respective cassette storage location 6C, whereupon the cassette carriage 11 is moved vertically as needed in the direction of the arrows Y—Y relative to the vertical guide rail 10C which, in turn, is moved horizontally in the direction of the arrows X—X so as to register with the side-loading port or opening of a selected one of the VTRs 3, and the transported cassette C1 is then transferred from the cassette carriage 11 through the cassette delivery mechanism 4 into the selected VTR 3 for reproducing or recording a signal on the tape in the selected cassette C1. After the desired recording or reproducing operation has been performed, the used cassette C1 is returned through the cassette delivery mechanism 4 to the cassette carriage 11 on the vertical guide rail 10C which is then moved horizontally in the direction of the arrows X—X, whereupon the cassette carriage 11 is moved vertically in the direction of the arrows Y—Y for registering the cassette carriage 11 with the cassette storage bin into which the used cassette C1 is to be returned. This may or may not be the cassette storage bin 5C from which the cassette C1 was originally selected. Then, the returned cassette C1 is transferred from the cassette carriage 11 to the cassette storage bin with which it is registered.

When such a known cassette autochanger is used in a broadcasting station to select and transmit programs comprising commercial messages or advertisements and television programs, there is provided a system controller which maintains a reproduction list to which additions can be made and from which deletions can be made by operation of a keyboard. The reproduction list is primarily a listing of the programs to be reproduced by the cassette autochanger and the order of reproduction.

Suppose then that a segment of the reproduction list consists of a sequence of programs (identified CM) as follows:

CM001
CM002
CM003
CM004
CM002

Until now there have been two ways in which programs have generally been recorded in the cassettes in such a cassette autochanger. In the one cassette for one program recording system, each program is recorded in a respective single cassette. For such a system the above reproduction list presents no problems because the respective cassettes for the first four programs CM001, CM002, CM003 and CM004 can be selected in sequence and brought to the VTRs for reproduction in the required sequence. At least by the time reproduction of one program approaches its end, the cassette with the next program to be reproduced is in a stand-by condition in another VTR 3.

The cassette for the program CM002 is then reselected. This may involve retrieval from a cassette storage bin if the cassette has been returned after the first reproduction, or alternatively, if the time durations of the intervening programs are short, the cassette may have been left in a VTR 3 after the first reproduction ready for the second.

However, this system does have the serious problems that it is very wasteful of recording capacity in the cassettes, and that the number of programs available for automatic reproduction is restricted to the number of cassette storage bins in the cassette autochanger.

As an alternative, therefore, the multisegment recording system is used. In this system, a plurality of programs are recorded in each cassette, so reducing waste of recording capacity and substantially increasing the number of programs that can be made available. However, with this system also, there are serious problems. Thus, in an individual cassette, programs are recorded successively on the magnetic tape with intervals between adjacent programs. Suppose then that in the above example the programs CM001, CM002 and CM003 happen to be recorded in the same cassette.

Even if the programs happen to be recorded on the tape in the order CM001, CM002, CM003 their successive reproduction without gaps between programs will be impossible.

One object of the present invention is to provide a cassette autochanger in which the above-mentioned problems of the two known recording systems are overcome.

Another object of the present invention is to provide for automatic re-recording of programs such that every program is recorded in two different cassettes.

Another object of the present invention is to provide a cassette autochanger which permits successive reproduction of any selected sequence of recorded programs.

Another object of the present invention is to provide a cassette autochanger system comprising a main cassette autochanger and a back-up cassette autochanger, and in which reproduction is automatically passed, when necessary, to the back-up cassette autochanger.

According to the present invention there is provided a cassette autochanger for automatically supplying and selectively reproducing a plurality of cassettes having programs recorded on recording media thereof, the cassette autochanger comprising:
- a plurality of reproducing/recording means;
- a cassette housing means having a plurality of cassette storage locations;
- cassette transporting means for selectively transporting said cassettes between said cassette storage locations and said reproducing/recording means; and
- control means for controlling the operation of said reproducing/recording means and said cassette transporting means, said control means comprising:
- first detecting means for detecting any one of said programs that is recorded on the recording medium in one only of said cassettes; second detecting means for detecting two of said reproducing-/recording means which are available for use; and
- dubbing control means for controlling said two reproducing/recording means detected by said second detecting means so that said one of said programs detected by said first detecting means is automatically dubbed into another said cassette using said two reproducing/recording means.

Every program found to be recorded in one cassette only is thus automatically dubbed (that is, duplicated) into a second, different cassette, so that reproduction of the programs in any required order is possible.

According to the present invention there is also provided a cassette autochanger system comprising:
- a first cassette autochanger for automatically supplying and selectively reproducing a plurality of cassettes having programs recorded on recording media thereof, the first cassette autochanger comprising:
- a plurality of first reproducing means;
- a first cassette housing means having a plurality of first cassette storage locations;
- first cassette transporting means for selectively transporting said cassettes between said first cassette storage locations and said first reproducing means; and
- first control means for controlling the operation of said first reproducing means and said first cassette transporting means according to a reproduction list which shows the order of reproduction of said programs, said first control means updating the reproduction list as reproduced by said first reproducing means and being capable of transmitting said updated reproduction list to a location external to said first cassette autochanger; and
- a second cassette autochanger for automatically supplying and selectively reproducing a plurality of cassettes having programs recorded on recording media thereof, the second cassette autochanger comprising:
- a plurality of second reproducing means;
- a second cassette housing means having a plurality of second cassette storage locations;
- second cassette transporting means for selectively transporting said cassettes between said second cassette storage locations and said second reproducing means; and
- second control means, operative when said first cassette autochanger is out of order, for controlling the operation of said second reproducing means and said second cassette transporting means according to said updated reproduction list which has been transmitted from said first control means, said second control means updating said reproduction list as each of said programs is reproduced by said second reproducing means; and
- selecting means for selecting the output of said first or said second reproducing means, the output of said first reproducing means usually being selected, and when said first autochanger is out of order the output of said second reproducing means being selected.

This provides for automatic updating of the reproduction list in the second cassette autochanger such that the second autochanger can take over reproduction immediately if for any reason the first cassette autochanger becomes out of order.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 is a flow chart of a main routine;

FIG. 4 is a flow chart of an original program recording routine;

FIG. 5 is a flow chart of a dubbing routine;

DESCRIPTION OF THE PREFERRED EMBODIMENTS

Figure 1:
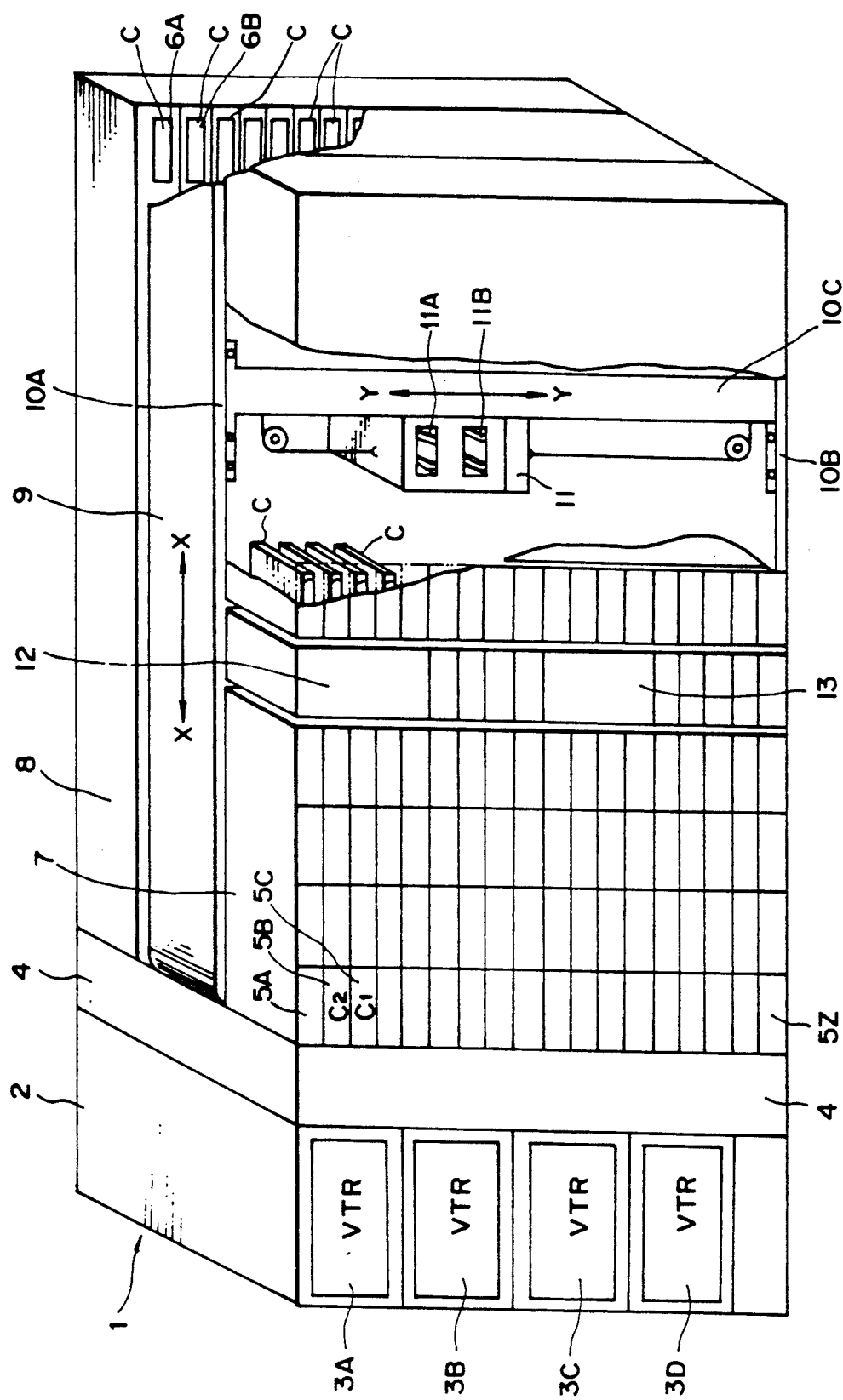
FIG. 1 is a diagrammatic perspective view of a known cassette autochanger.
Figure 2:
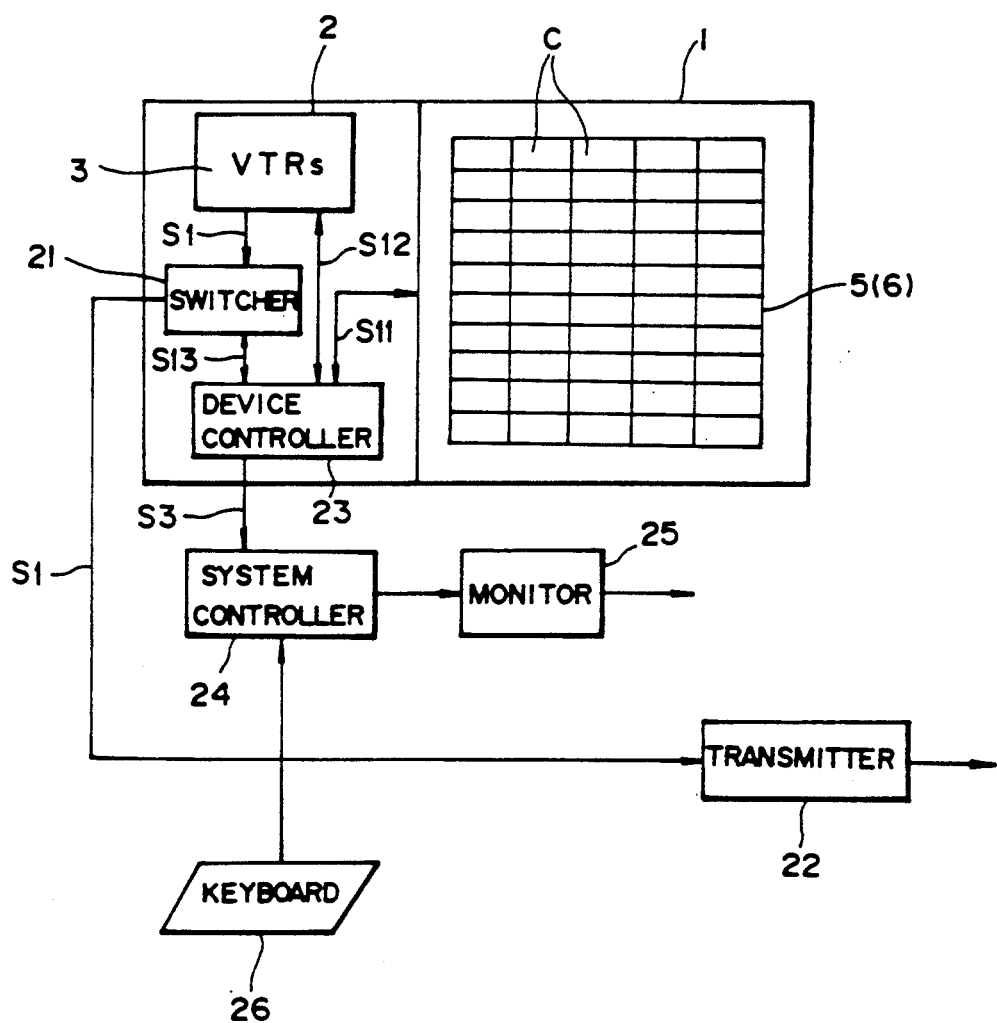
FIG. 2 shows in block diagrammatic form an embodiment of cassette autochanger according to the present invention.

Referring first to FIG. 2, the embodiment of cassette autochanger to be described can, for example, be used in a broadcasting station to select and transmit programs comprising commercial messages or advertisements, and television programs. The same references are used in FIGS. 1 and 2 for the same elements.

As compared with the cassette autochanger described with reference to FIG. 1, the embodiment additionally comprises a switcher 21 by way of which a signal S1 comprising a program reproduced from a selected cassette by a VTR 3 is supplied to a transmitter 21 for broadcasting. A device controller 23, such as a microcomputer, is connected to the cassette delivery mechanism 4 (FIG. 1), the VTRs 3 and the switcher 21 for supplying and receiving command and information signals S11, S12 and S13 respectively. An overall system controller 24, such as a host computer, is connected to the device controller 23 for supplying and receiving command and information signals S3, and is also connected to a monitor 25 and a keyboard 26.

The system controller 24 maintains a reproduction list to which additions can be made and from which deletions can be made by operation of the keyboard 26 whilst the reproduction list is viewed on the monitor 25. The reproduction list is primarily a listing of the programs to be reproduced by the cassette autochanger for broadcast transmission, and the order of reproduction. The reproduction list also comprises information such as broadcast times, program durations and so on, but such information is not of relevance to the present description.

If the cassette autochanger fails to operate normally a message is displayed on the monitor 25.

In operation of the cassette autochanger, the system controller 24 executes a main routine within which are a plurality of sub-routines primarily effected by the device controller 23. FIG. 3 is a flow chart of the main routine. In response to a routine start command at step SP1, the system controller 24 initializes the cassette autochanger at step SP2. Alternative steps SP3, SP4 and SP5 then provide a choice of an original program recording routine, a dubbing routine and other routines, respectively. The other routines include a program transmission routine for transmission of selected programs, according to the reproduction list. When the answer to the end query at step SP6 is NO a further sub-routine can be selected, and when the answer is YES the main routine comes to an end at step SP7.

As discussed above in relation to the known autochanger of FIG. 1, both the one cassette for one program recording system and the multisegment recording systems have problems, and these problems are overcome in this embodiment by using a modified recording system in which each program is recorded in two different cassettes. Of course such double recording can be in a modified one cassette for one program system, but clearly it is generally much more advantageous to use a modified multisegment recording system, as substantially fewer cassettes are required. With such a recording system, whatever program is currently being reproduced, the next program called for on the reproduction list is always available in a cassette different from the cassette currently being reproduced from, and that other cassette can therefore be selected, loaded into a VTR 3 and brought to the stand-by condition ready for reproduction. This is true even if the program which has been called for next is also recorded in the cassette currently being reproduced. Thus sequential transmission of programs in any order without gaps between programs is always possible.

This will now be described in more detail starting with the original recording of a program consisting of a commercial message, preferably at a time which does not conflict with the transmission of programs. When step SP3 in the main routine (FIG. 3) is selected, the device controller 23 effects the original program recording routine, the flow chart of which is shown in FIG. 4.

A cassette C is selected from the cassette storage bins and is supplied by the cassette delivery mechanism 4 (FIG. 1) to be loaded into a VTR 3. The incoming program is then recorded in the cassette C at step SP31. The cassette C in which the program has been recorded is then stored at a selected location in a cassette storage bin.

Upon the completion of the recording operation of the VTR 3, the device controller 23 executes a test procedure comprising a step of sending the cassette C storing the newly recorded program to a VTR 3, similarly to sending the cassette C to a VTR 3 for broadcasting the program, a step of testing the cassette C to see if the program is recorded correctly, and a step of returning the cassette C to a cassette storage bin. If the program is not recorded correctly, the routine returns to step SP31 to repeat the same recording procedure.

If the response to the query in step SP32 is YES, that is, if the program is recorded correctly in the cassette C, the device controller 23 registers the recorded program as a once recorded program in a program data base provided in the device controller 23, and then returns to the main routine in step SP33.

Thus, when a request is made for recording an original program, the device controller 23 records the original program by using one of the VTRs 3 as a program recording means.

Subsequent to such recording of an original program, and likewise preferably at a time which does not conflict with transmission of programs, the once recorded program is dubbed. When step SP4 in the main routine (FIG. 3) is selected, the device controller 23 effects the dubbing routine, the flow chart of which is shown in FIG. 5.

At step SP41, the device controller 23 makes a query to see if there are two VTRs 3 available for use. When the response in step SP41 is YES the device controller 23 executes a data base monitoring procedure in step SP42 to ascertain if there is any recorded program recorded in the program data base as a once recorded program.

When there is a cassette in which an original program has just been recorded in step SP3 (FIG. 4) and the dubbing of the recorded program has not been effected, the response in step SP42 is YES. Then the device controller 23 executes step SP43 to dub the recorded program, that is, the once recorded program, in a second cassette by sending the cassette storing the once recorded program and another cassette to respective VTRs 3.

In dubbing the once recorded program, the device controller 23 uses two VTRs 3 detected as available, namely, one VTR 3 for reproducing the once recorded program from the first cassette, and the other for dubbing the once recorded program in the second cassette.

After the completion of the dubbing procedure, the device controller 23 makes a query in step SP44 to see if the once recorded program has been dubbed correctly in the second cassette, by executing a test procedure, in which the second cassette is sent to the VTR console 2, the dubbed program is reproduced from the second cassette to see if the program is recorded correctly, and then the second cassette is returned to a cassette storage bin.

If the response in step SP44 is NO, namely, the once recorded program is not dubbed correctly in the second cassette, the device controller 23 executes step SP43 again to dub the once recorded program in the second cassette. If the response in step SP44 is YES, the device controller 23 registers the once recorded program as now a dubbed program in the program data base.

After thus completing the dubbing procedure, the device controller 23 returns to the main routine in step SP45.

The dubbing procedure is executed when the response in step SP41 is YES, namely, when two VTRs 3 are found to be available for the dubbing procedure. If the response in step SP41 is NO, namely, if two VTRs 3 are not found to be available, the device controller 23 JUMPs to step SP45 to return to the main routine without executing the steps following step SP41.

Thus, the device controller 23 does not execute the dubbing procedure when two VTRs 3 are not available, and remains standing by until two VTRs 3 become available.

If the response in step SP42 is NO, namely, if there is not any once recorded program, and all the programs are recorded in duplicate in the stored cassettes, the device controller 23 decides that the dubbing routine is completed and jumps to step SP45 to return to the main routine.

The original program recording procedure is executed for every request for recording an original program.

The device controller 23 executes the dubbing procedure in step SP4 to dub the once recorded program recorded in a first cassette in a second cassette when the response in step SP41 is YES, namely, when two VTRs 3 are available.

Thus, the device controller 23 does not execute the dubbing procedure whilst the VTR console 2 (FIG. 2) is busy, for example, while the VTR console 2 is required to transmit a plurality of programs successively, and executes the dubbing procedure to dub a recorded program recorded in a first cassette in the second cassette using two VTRs 3 when the VTR console 2 has at least two VTRs 3 spare, and this may be, for example, while a long program is being broadcast.

Thus only spare VTRs 3 are used for original recording or dubbing, priority being given to any reproduction required for broadcasting.

The cassettes C employed in this embodiment for recording programs are tape cassettes, but any suitable recording media may be employed provided that it is capable of recording programs for broadcasting and of allowing the reproduction of the recorded programs.

Although the embodiment has been described as applied to the duplicate recording of a commercial message, the present invention may be applied to the duplicate recording of programs other than commercial messages.

As mentioned above, the cassette autochanger gives priority to broadcasting requirements, and indeed the need for programs to be reliably available for reproduction and broadcasting is commonly so great that a system comprising duplicate cassette autochangers is provided, the first cassette autochanger being the one usually in use, and the second cassette autochanger providing a back-up which is automatically brought into use if the first cassette autochanger fails.

Figure 6:
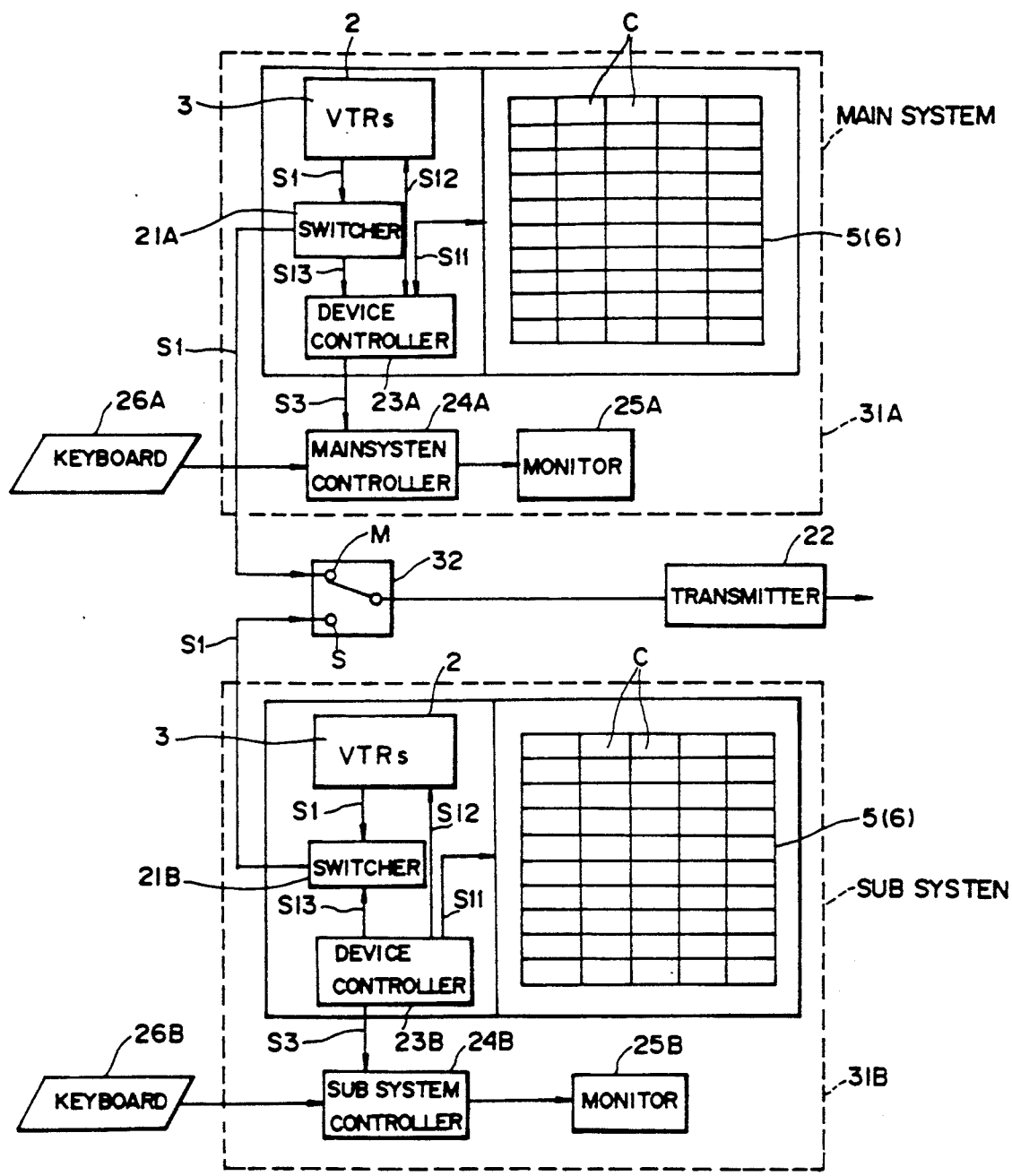
FIG. 6 shows in block diagramatic form a previously proposed cassette autochanger system.

Such a cassette autochanger system is shown in FIG. 6 to comprise two similar cassette autochangers 31A and 31B, each of which is substantially the same as the cassette autochanger described above with reference to FIG. 2. The same reference numerals are used in FIGS. 2 and 6 for the same elements. The outputs of the cassette autochangers 31A and 31B are respectively connected to input terminals M (main) and S (stand-by) of a switcher 32, the output terminal of which is connected to the transmitter 22 which is common to the two cassette autochangers 31A and 31B.

In use of the cassette autochanger system, the switcher 32 is usually set with the terminal M engaged, so that the output of the cassette autochanger 31A is supplied to the transmitter 22. However, in the event of failure of the cassette autochanger 31A, the main system controller 34A senses the failure and causes the switcher 32 to change over to engage the terminal S, so that the output of the cassette autochanger 31B is supplied to the transmitter 22, and the sub system controller 24B therein takes over control. The main system controller 24A also causes a warning message to be displayed on the monitor 25A and/or the monitor 25B.

Such a cassette autochanger system is very expensive due to the duplication of the cassette autochangers, one of which is probably seldom used.

As a further aspect of the present invention, therefore, there is provided a cassette autochanger system comprising first and second cassette autochangers. The first cassette autochanger has a system controller which, in addition to the functions mentioned above, updates the reproduction list periodically, for example after each one, five or ten programs has been reproduced, and supplies the up-dated reproduction list, preferably immediately it has been up-dated, to the system controller in the second cassette autochanger where it is stored.

Figure 7:
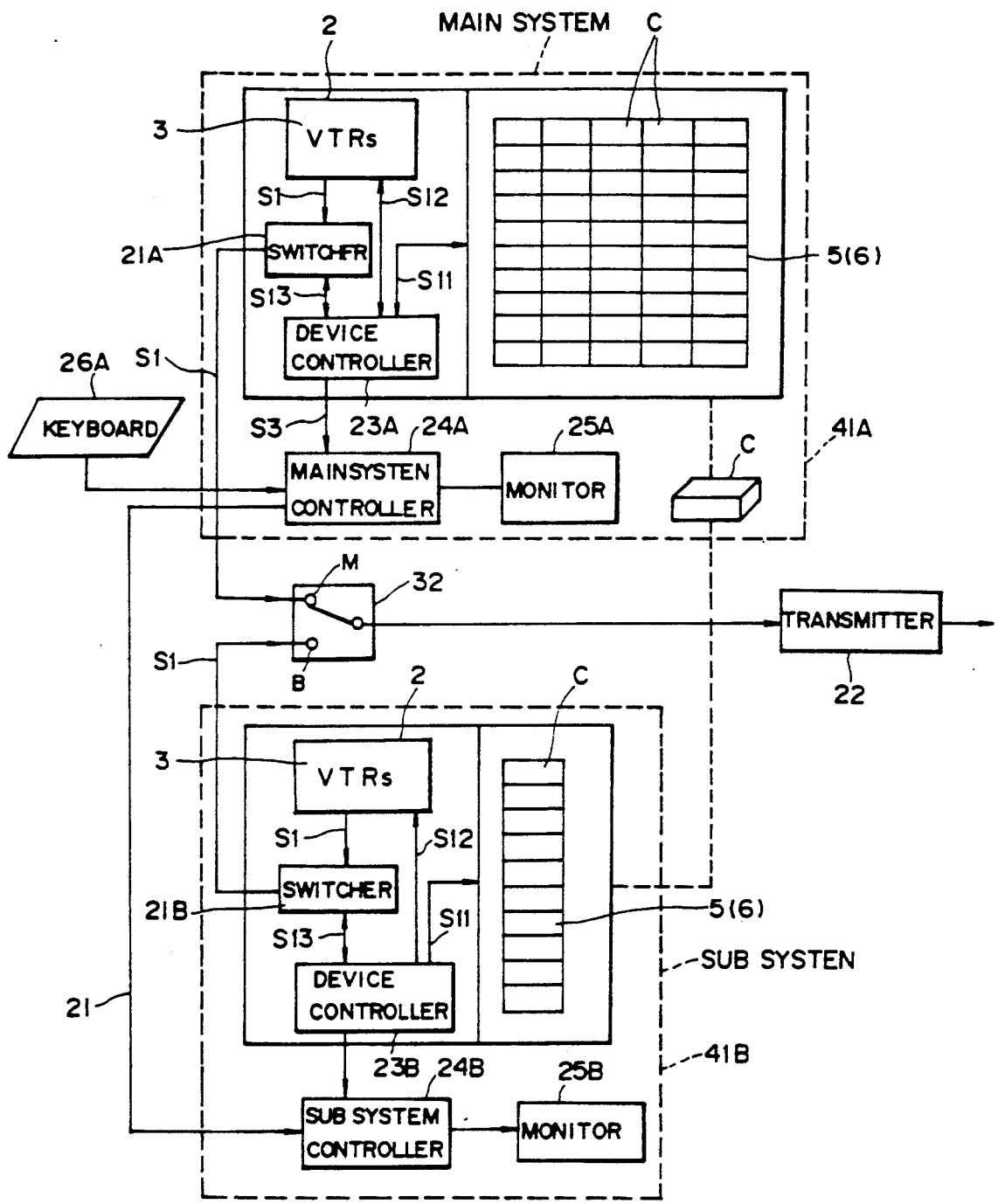
FIG. 7 shows in block diagrammatic form an embodiment of cassette autochanger system according to the present invention.

An embodiment of such a cassette autochanger system according to the present invention is shown in FIG. 7. The same reference numerals are used in FIGS. 6 and 7 for the same elements.

As seen in FIG. 7 the cassette autochanger system comprises first and second cassette autochangers 41A and 41B which are similar to one another, and to the cassette autochanger of FIG. 2, but with the difference that the second cassette autochanger 41B has far fewer cassette storage bins. This means that the second cassette autochanger 41B is relatively small, simple and cheap.

In operation, if the first cassette autochanger 41A fails for any reason, the second cassette autochanger 41B takes over. That is, the main system controller 24A causes the switcher 32 to reverse, so that the output of the second cassette autochanger 41B is selected for supply to the transmitter 22, and the sub system controller 24B assures control. Meanwhile the operator, who will have been alerted to the failure by the main system controller 24A, takes the required cassettes from the first cassette autochanger 41A and loads them into the cassette storage bins of the second cassette autochanger 41B, as indicated by the broken line in FIG. 7. The locations in which cassettes are loaded is not critical, because the cassettes have bar codes which can be read by the second cassette autochanger 41B to enable the locations thereof to be stored in its data base. The cassette autochanger 41B can then continue reproducing programs as required for transmission in accordance with the updated reproduction list.

Such a cassette autochanger system is not only smaller, simpler and cheaper; it is also more flexible, as the second cassette autochanger 41B is not necessarily dedicated to the back-up function. It can, for example, be used routinely for reproducing programs for transmission, particularly if they are long, and even on a different channel, so freeing the first cassette autochanger 41A for other use, such as the original recording and dubbing routines described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A cassette autochanger for automatically supplying and selectively reproducing a plurality of cassettes having programs recorded on recording media thereof, the cassette autochanger comprising:
    a plurality of reproducing/recording means;
    a cassette housing means having a plurality of cassette storage locations;
    cassette transporting means for selectively transporting said cassettes between said cassette storage locations and said reproducing/recording means; and
    control means for controlling the operation of said reproducing/recording means and said cassette transporting means, said control means comprising:
        first detecting means for determining whether any one of said programs is recorded only in one of said cassettes but not in a plurality of said cassettes;
        second detecting means for determining whether any two of said reproducing/recording means are available for use; and
        dubbing control means for controlling said two of said reproducing/recording means to automatically dub said one of said programs onto another one of said cassettes when said one of said programs recorded in only one of said cassettes is determined by said first detecting means, thereby making available both of said cassettes for reproduction of said one of said programs.

2. A cassette autochanger according to claim 1 wherein said control means controls the operation of said plurality of reproducing/recording means and said cassette transporting means according to a reproduction list which lists the order of reproduction of said programs.

3. A cassette autochanger according to claim 2 comprising a keyboard for inputting data for said reproduction list.

4. A cassette autochanger according to claim 2 comprising a monitor on which said reproduction list can be displayed.

5. A cassette autochanger according to claim 1 wherein after dubbing said one of said programs detected by said first detecting means on the said other cassette, said control means tests whether said dubbing has been executed correctly and if it has not been executed correctly, said dubbing is executed again.

6. A cassette autochanger according to claim 1 wherein an externally-supplied signal can be recorded on said recording medium in a said cassette by said reproducing/recording means.

7. A cassette autochanger according to claim 6 wherein after recording said externally-supplied signal, said control means tests whether said recording has been executed correctly and if it has not been executed correctly, said recording is executed again.

* * * * *